(12) United States Patent
Chapuis et al.

(10) Patent No.: US 6,326,624 B1
(45) Date of Patent: Dec. 4, 2001

(54) DEVICE AND METHOD FOR DETERMINING THE ASSUMED POSITION OF A PHENOMENON RELATIVE TO A SET OF PHOTODETECTORS, AND APPLICATION TO GAMMA-CAMERAS

(75) Inventors: Alain Chapuis, Saint-Martin-le-Vinoux; Claude Janin, Grenoble; Corinne Mestais, La Terrasse; Michel Tararine, Meudon, all of (FR)

(73) Assignee: Commissariat a l'Energie Atomique, Paris (FR)

( * ) Notice: Subject to any disclaimer, the term of this patent is extended or adjusted under 35 U.S.C. 154(b) by 0 days.

(21) Appl. No.: 09/284,977

(22) PCT Filed: Nov. 7, 1997

(86) PCT No.: PCT/FR97/02010

§ 371 Date: Jun. 15, 1999

§ 102(e) Date: Jun. 15, 1999

(87) PCT Pub. No.: WO98/21607

PCT Pub. Date: May 22, 1998

(30) Foreign Application Priority Data

Nov. 8, 1996 (FR) .................................................. 96 13669

(51) Int. Cl.[7] .................................................. G01T 1/164
(52) U.S. Cl. ...................................... 250/369; 250/363.09
(58) Field of Search ............................... 250/369, 363.02, 250/363.09, 370.11, 370.12, 390.11; 702/150

(56) References Cited

U.S. PATENT DOCUMENTS

| 3,011,057 | 11/1961 | Anger . | |
|---|---|---|---|
| 4,580,055 | * 4/1986 | Barfod | ................................. 250/365 |
| 4,672,542 | 6/1987 | Roux et al. . | |

FOREIGN PATENT DOCUMENTS 2 669 439   5/1992   (FR) .

OTHER PUBLICATIONS

Shibahara Tokuyuki, Patent Abstracts of Japan, "Gamma Camera," (62167493) Jul. 23, 1987.

* cited by examiner

Primary Examiner—Georgia Epps
Assistant Examiner—Richard Hanig
(74) Attorney, Agent, or Firm—Oblon, Spivak, McClelland, Maier & Neustadt, P.C.

(57) ABSTRACT

Method and apparatus for determining a position of an event. The system processes signals from an assembly of N photodetectors and includes a signal generator for producing a signal representing the value of the maximum, or the energy, of a pulse delivered by the photodetector and is digitized. It also includes a signal generator for producing a threshold-exceeded signal for each photodetector when the amplitude of the signal representing the value of the maximum, or the energy, of the digitized pulse is greater than the threshold. It also includes a signal generator common to the photodetectors, for delivering a signal representing a position of an event as a function of the threshold-exceed signals. This device can be used with gamma cameras.

34 Claims, 9 Drawing Sheets

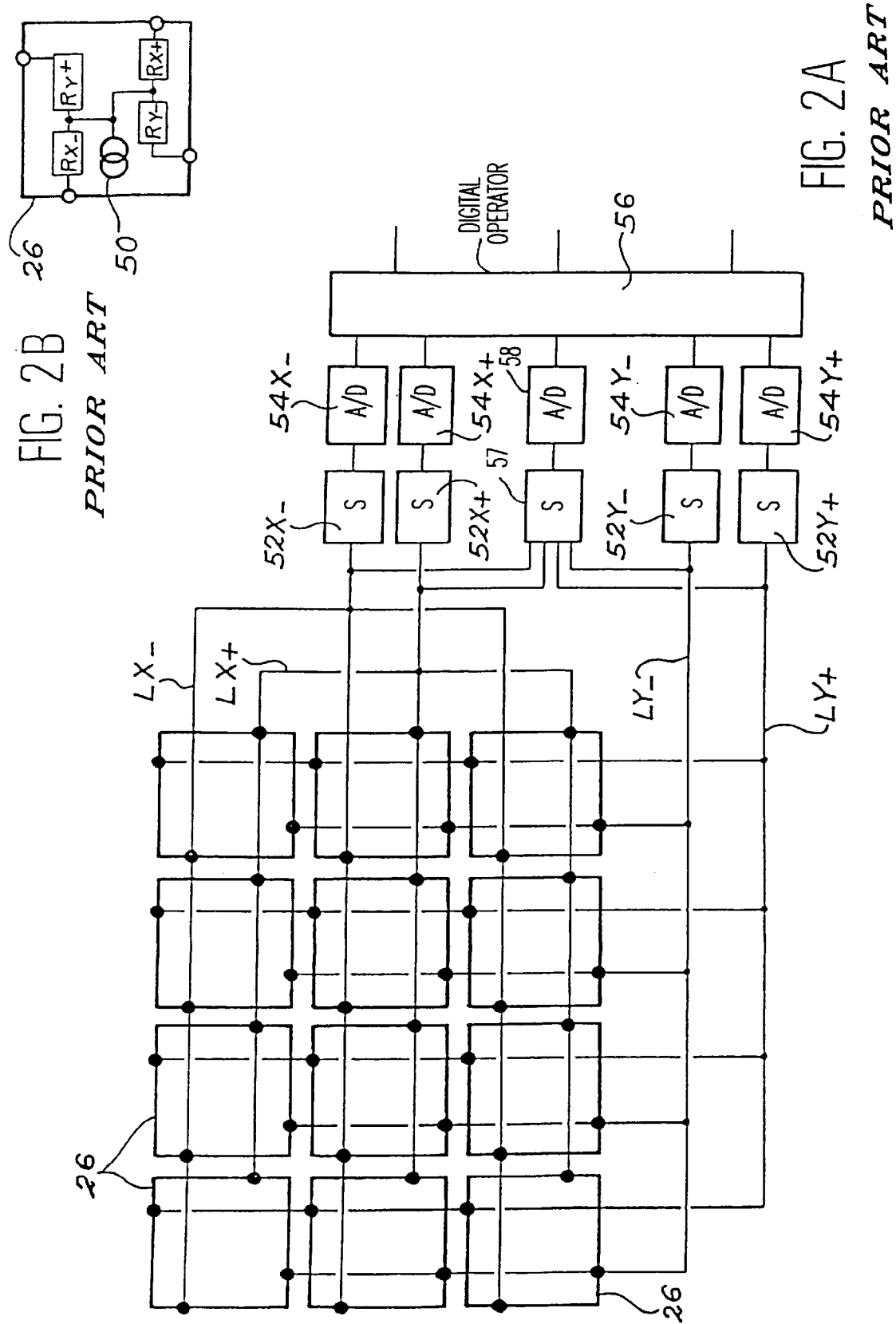

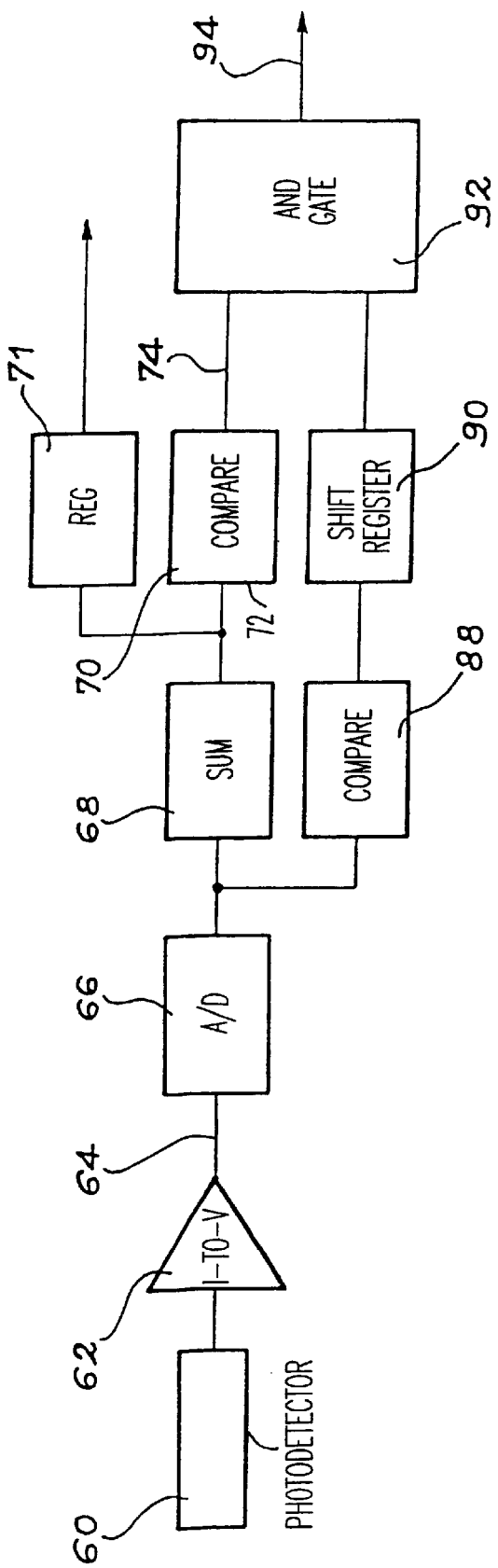
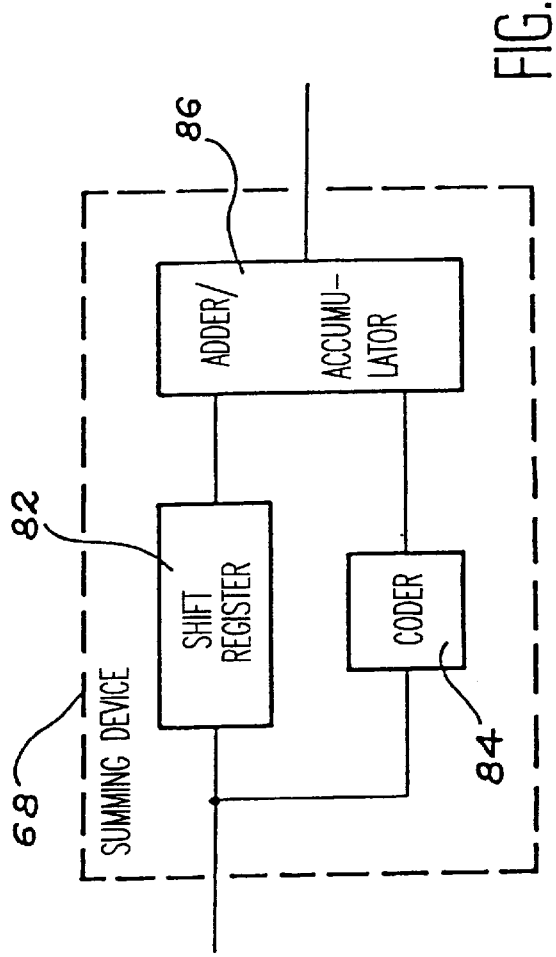

DEVICE AND METHOD FOR DETERMINING THE ASSUMED POSITION OF A PHENOMENON RELATIVE TO A SET OF PHOTODETECTORS, AND APPLICATION TO GAMMA-CAMERAS

BACKGROUND OF THE INVENTION

1. Field of the Invention

The present invention concerns a device for determining the presumed position of an event inducing a signal, in photodetectors, this position being, for example, located in relation to the photodetector assembly.

The invention applies in particular to determination of the position of an event from signals supplied by photomultipliers equipping a gamma camera, the position being located in relation to the photomultipliers themselves. Gamma camera means a camera sensitive to gamma (γ) radiation. Such cameras are used notably for the purposes of medical imaging.

2. Discussion of the Background

At the present time, the majority of gamma cameras used in nuclear medicine are cameras operating according to the principle of Anger type cameras. This subject can be referred to U.S. Pat. No. 3,011,057.

Gamma cameras make it possible in particular to visualize the distribution, in an organ, of molecules labelled with a radioactive isotope previously injected into the patient.

The structure and operation of a known gamma camera are described and summarized below with reference to the accompanying FIGS. 1, 2A and 2B.

FIG. 1 shows a detection head 10 of a gamma camera disposed opposite an organ 12 containing molecules labelled with a radioactive isotope.

The detection head 10 has a collimator 20, a scintillator crystal 22, a light guide 24 and a plurality of photomultiplier tubes 26 juxtaposed so as to cover one face of the light guide 24. The scintillator is, for example, a crystal of NaI (Tl).

The function of the collimator 20 is to select from among all the gamma radiations 30 emitted by the organ 12 those which reach the detection head substantially at normal incidence. The selective nature of the collimator makes it possible to increase the resolution and clarity of the image produced. However, the increase in resolution is made to the detriment of the sensitivity. By way of example, for around 10,000 γ photons emitted by the organ 12, one single photon is actually detected.

The γ photons which have passed through the collimator reach the scintillator crystal 22 where nearly every γ photon is converted into a plurality of light photons. In the remainder of the text, event designates each interaction of a gamma photon with the crystal, causing a scintillation.

The photomultipliers 26 are designed to emit an electrical pulse proportional to the number of light photons received from the scintillator for each event.

So that a scintillation event can be localized more precisely, the photomultipliers 26 are not placed directly side by side with the scintillator crystal 22 but are separated from the latter by the light guide 24.

The photomultipliers emit a signal whose amplitude is proportional to the total quantity of light produced in the scintillator by gamma radiation, that is to say proportional to its energy. However, the individual signal from each photomultiplier also depends on the distance which separates it from the point of interaction 30 of the gamma radiation with the material of the scintillator. This is because each photomultiplier delivers a current pulse proportional to the light flux it has received. In the example of FIG. 1, small graphs A, B, C show that photomultipliers 26a, 26b and 26c situated at different distances from a point of interaction 30 deliver signals with different amplitudes.

The position of the point of interaction 30 of a gamma photon is calculated in the gamma camera from signals coming from the photomultiplier assembly by performing a barycentric weighting of the contributions of each photomultiplier.

The principle of barycentric weighting as implemented in Anger type cameras emerges more clearly on referring to the accompanying FIGS. 2A and 2B.

FIG. 2A shows the electrical wiring of a detection head 10 of a gamma camera, which connects this camera to an image forming unit. The detection head has a plurality of photomultipliers 26.

As shown in FIG. 2B, each photomultiplier 26 of the detection head is associated with four resistors denoted $RX^-$, $RX^+$, $RY^-$ and $RY^+$. The values of these resistors are specific to each photomultiplier and depend on the position of the photomultiplier in the detection head 10.

The resistors $RX^-$, $RX^+$, $RY^-$ and $RY^+$ of each photomultiplier are connected to the output 50 of the said photomultiplier, represented in FIG. 2B by a current generator symbol. They are moreover respectively connected to common collector lines denoted $LX^-$, $LX^+$, $LY^-$ and $LY^+$, in FIG. 2A.

The lines $LX^-$, $LX^+$, $LY^-$ and $LY^+$ are in turn connected respectively to analog integrators $52X^-$, $52X^+$, $52Y^-$ and $52Y^+$, and, by means of the latter, to analog-to-digital converters $54X^-$, $54X^+$, $54Y^-$ and $54Y^+$. The output of the converters $54X^-$, $54X^+$, $54Y^-$ and $54Y^+$ is taken to a digital operator 56. The lines $LX^-$, $LX^+$, $LY^-$ and $LY^+$ are furthermore connected to a common path, referred to as the energy path. This path also has an integrator 57 and an analog-to-digital converter 58 and its output is also taken to the operator 56.

By virtue of the device of FIG. 2, the position of the interaction is calculated according to the following equations (U.S. Pat. No. 4,672,542):

$$X = \frac{X^+ - X^-}{X^+ + X^-} \text{ and}$$

$$Y = \frac{Y^+ - Y^-}{Y^+ + Y^-}$$

in which X and Y indicate the coordinates, along two orthogonal directions, of the position of the interaction on the crystal and in which $X^+$, $X^-$, $Y^+$, $Y^-$ indicate respectively the weighted signals delivered by the integrators $52X^+$, $52X^-$, $52Y^+$, $52Y^-$.

The values of X and Y, as well as the total energy E of the gamma ray which has interacted with the crystal, are produced by the digital operator 56. These values are next used for constructing an image as described, for example, in the document FR-2 669 439.

The calculation of the position of the interaction is marred by an uncertainty related to the statistical Poisson fluctuations of the number of light photons and the number of photoelectrons produced for each event, that is to say for each gamma photon detected. The higher the number of photons or photoelectrons, the smaller is the standard deviation of the fluctuation. Because of this phenomenon, the light should be collected as carefully as possible. The intrinsic spatial resolution of the camera is characterised by the mid-height width of the distribution of the positions calculated for one and the same collimated point source placed on the scintillator crystal.

For gamma rays with an energy of 140 keV, the resolution is generally of the order of 3 to 4 mm.

The energy of a detected gamma photon is calculated by summing the contributions of all the photomultipliers which have received light. This is also marred by a statistical fluctuation. The resolution energy-wise of the camera is characterised by the ratio of the mid-height width of the distribution of the calculated energies to the mean value of the distribution, for one and the same source.

The resolution energy-wise is generally of the order of 9 to 11% for gamma rays with an energy of 140 keV.

Finally, an Anger type gamma camera has the advantage of making it possible to calculate in real time the barycentre of the signals from photomultipliers with very simple means.

This is because the system described previously has a limited number of components. Moreover, the resistors used to inject the signal from the photomultipliers into the collector lines are very inexpensive.

Such a camera has however also a major drawback, which is a reduced counting rate. Counting rate means the number of events, that is to say interactions between a γ photon and the scintillator, which the camera is capable of processing per unit of time.

One of the limitations of the counting rate is due notably to the fact that the camera is incapable of processing two events taking place substantially simultaneously at distinct points of the scintillator crystal.

This is because simultaneous but geometrically distinct events give rise to electrical signals which stack up in the collector lines $LX^-$, $LX^+$, $LY^-$ and $LY^+$ and which can no longer be distinguished. These events are also "lost" for the formation of an image.

The limitation of the counting rate is not too important a constraint in the traditional medical imaging techniques. This is because, as indicated above, the collimator stops a very large number of gamma rays and only a small number of events are actually detected.

Gamma cameras are however also used in two other medical imaging techniques where the limitation of the counting rate is a crippling constraint.

These techniques are the so-called "attenuation equalisation by transmission" and "coincidence PET (Positron Emission Tomography)" techniques.

The attenuation equalisation by transmission technique consists of taking into account, at the time of forming a medical image, the attenuation belonging to the tissue of the patient surrounding the organ examined. In order to know this attenuation, a measurement is made of the transmission of gamma radiations to a gamma camera through the body of the patient. To that end the patient is made to take a position between a highly active external source and the detection head of the gamma camera. Thus, at the time of measuring the transmitted radiation, a high number of events take place in the scintillator crystal. The high number of events per unit of time also increases the probability of having a number of substantially simultaneous events. A conventional Anger type camera then proves to be inappropriate.

The PET technique consists of injecting into the patient an element such as $F^{18}$ capable of emitting positrons. The annihilation of a positron and an electron releases two γ photons emitted in opposite directions and having an energy of 511 keV. This physical phenomenon is taken advantage of in the PET imaging technique. In this technique, use is made of a gamma camera with at least two detection heads disposed on either side of the patient. The detection heads used are not equipped with a collimator. This is because electronic processing of the information, referred to as coincidence processing, makes it possible to select, from among the events, those which coincide timewise, and to thus calculate the trajectory of the gamma photons.

The detection heads are therefore subjected to high gamma radiation fluxes. The conventional Anger type gamma cameras have a counting rate which is generally too limited for such an application.

For information only, an Anger type gamma camera can normally operate with a detection of $1.10^5$ events per second, whereas in PET imaging at least $1.10^6$ events per second are necessary for normal operation.

Another limitation of Anger type gamma cameras, described above, is due to the fact that the calculation of the barycentre of an event is definitively fixed by the construction of the detection head and notably by the choice of the resistors $RX^-$, $RX^+$, $RY^-$, $RY^+$ for each photomultiplier. Similarly, the calculation of the energy is fixed by the wiring of the photomultipliers on to a common path (the energy path).

SUMMARY OF THE INVENTION

The present invention proposes a device and a method for processing signals from an assembly of N photodetectors, permitting a higher counting rate than that of the known Anger type cameras. Moreover, such a device (or method) allows a rapid determination of an area of the assembly of N photodetectors concerned by an event. Taking such an area into account permits a processing of the signals which is more efficient than in the known devices.

An aim of the invention is also to propose a device and a method which allows a more flexible processing of the signals received by an assembly of N photomultipliers or photodetectors, permitting the implementation of various calculation algorithms, and not solely an algorithm defined by the choice of the characteristics of the photodetectors, in particular by the choice of the resistors $RX^+$, $RX^-$, $RY^+$, $RY^-$ in the case of a gamma camera head of the prior art.

More precisely, an object of the invention is a device for processing signals from an assembly of N photodetectors having:

means, associated with each photodetector, for producing a signal representing the value of the maximum, or the energy, of a pulse delivered by the photodetector and digitized;

means for producing a threshold-exceeded signal for each photodetector when the amplitude of the signal representing the value of the maximum, or the energy, of the digitized pulse is greater than the said threshold;

means, common to the photodetectors, for delivering a signal representing a position of an event as a function of the threshold-exceeded signals.

Such a device therefore processes previously digitized data and makes it possible to produce a position signal with the help of which the area of the field of the photodetectors concerned by the interaction, or by the event, can be located or coded. When an event produces a meaningful signal, that is to say one whose amplitude or energy exceeds a threshold in a number of photodetectors, each corresponding digitized signal produces a threshold-exceeded signal. Depending on the distribution of the threshold-exceeded signals, a position signal may be issued.

This position information or signal can next, for example, be transmitted to means of calculating one or more characteristics of the event. These calculation means therefore do not need to read the whole of the photodetector field in order to determine the position of the event: the said position is already "coded" by the means which make it possible to deliver a position signal. They do not need, either, to take into account the photodetector assembly in order to determine a characteristic of the event, for example its energy. The reading of all the photodetectors would be long and would lead to a pronounced degradation of the counting rate performance.

Such a device makes it possible to avoid fixing the calculation of the position of the event by an array of resistors and wiring, as in the Anger cameras.

When a number of photodetectors are concerned with one event, that is to say when threshold-exceeded signals are issued corresponding to a number of photodetectors in response to one event, it may be advantageous to obtain a simultaneous or synchronized issuing of the different exceeded signals by the different threshold-exceeded signal production means concerned.

To that end and according to a particular embodiment, a device according to the invention also has means, associated with each photodetector, for detecting the timewise position of the maximum of the digitized pulse and means for delaying it by a certain duration so as to put it into synchronism with the maximum of the value of the corresponding integral.

According to another aspect, a device according to the invention may also have:

means for forming a total analog signal, equal to the sum of the analog signals delivered by $N_1$ photodetectors ($N_1 \leq N$);

means for delivering a signal representing the timewise position of the maximum of the total analog signal;

means for delaying the delivery of the signal representing the position of an event for a certain duration from the timewise position of the maximum of the total analog signal.

Thus, the position signal is issued with a certain shift with respect to the detection of the event (represented by the total analog signal), which makes it possible to take into account the time necessary for production of the integral by the summing device.

It is also possible to take account of signals validating the event inside a time slot whose instant of origin is fixed on the crossing of a threshold. The width is fixed so as to take into account only the signals produced during a certain time interval after crossing of the threshold. If it is known, statistically, that an event can induce threshold-exceeded signals during such a time interval, parasitic signals occurring later, outside the said interval, and not related to the event in question, can thus be eliminated.

If it is wished, furthermore, to take into account the physical principle according to which an event can activate only neighbouring photodetectors, or those defining a related surface or area, the means for delivering a position signal can be provided such that a signal is issued only if all the threshold-exceeded signals produced correspond to neighbouring or related photodetectors. It can also be provided that these means do not deliver any position signal when threshold-exceeded signals are issued by non-neighbouring photodetectors.

An object of the invention is also a device for detecting events, having:

a two-dimensional array of N photodetectors, defining a map;

digitization means, associated with each photodetector;

a device according to the invention, such as already described above.

The signal representing a position of an event has a first and a second component, each corresponding to a coordinate of the event located in the map of the photodetector array.

Generally, whatever the device adopted, in accordance with the invention, the means for delivering a signal representing a position of an event can also make it possible to deliver:

a first signal, representing a first position, if a single threshold-exceeded signal is delivered, coming from any first photodetector among the N photodetectors;

a second signal, representing a second position, if two threshold-exceeded signals are delivered, coming from two neighbouring photodetectors.

Thus, it is possible to locate the position of an event, not only in relation to the central positions of the photodetectors, but also in relation to an intermediate position between two neighbouring photodetectors. It is thus possible to distinguish between the case where the interaction takes place, more or less precisely, at the centre of a photodetector, and the case where the interaction takes place between two or three photodetectors. The importance of being able to perform this distinction lies in the fact that an environment specific to each case can then be taken into account when it is wished to calculate characteristics of the event, for example the barycentre of the site where it occurs, or its energy, without for all that needing to consider the responses of all the photodetectors.

An object of the invention is also a device for processing signals from an assembly of N photodetectors, having:

N digital coding units;

digital summation means associated with each digital coding unit;

means of comparing an output signal from the summation means with a predetermined value;

two read-access memories, addressed by the outputs of the comparison means.

Such a device makes it possible to implement a device for processing signals from an assembly of N photodetectors, such as already described above. In particular, the digital summation means (respectively, the means of detecting a maximum) associated with each digital coding unit make it possible to produce a signal representing the value of the energy (respectively, the amplitude) of a digital pulse; the means of comparing this signal with a predetermined value make it possible to produce a threshold-exceeded signal when the value of the energy (respectively, the amplitude) of the pulse is greater than the predetermined value; the read-access memory can be programmed so as to deliver a signal representing a position of an event as a function of the various threshold-exceeded signals.

Such a device can also have, associated with each digital coding unit:

means of detecting the timewise position of the maximum of a digitized pulse, these means being controlled by the corresponding digital coding unit;

a shift register; and an AND gate controlled by the output of the comparison means and the output of the shift register.

In this particular embodiment, there is associated, with each detector, means for detecting the timewise position of the maximum of a digitized pulse and for delaying the issuing of the threshold-exceeded signal until an instant to be determined.

The invention can also comprise:
- analog summation means intended to receive, at the input, the outputs of the N photodetectors;
- means of detecting a maximum of an analog signal, controlled by the analog summation means;
- a shift register controlled by the maximum-detecting means;
- a register controlled by the read-access memory and by the previous shift register.

An object of the invention is also a device for detecting events, having a two-dimensional array of N photodetectors and a device for processing signals from the assembly of N photodetectors, such as just described.

The invention also relates to a camera having a device, as described above, the photodetectors being photomultipliers.

The invention also relates to a gamma radiation imaging device, having such a camera.

The invention also relates to a method of processing signals produced by an assembly of N photodetectors, in response to an event, this method including:
- for each photodetector, the production of a signal representing the value of the maximum, or the energy, of a pulse delivered by the photodetector and digitized;
- the production of a signal of exceeding of a threshold ($V_r$), for each photodetector, when the amplitude of the signal representing the value of the maximum, or the energy, of the digitized pulse is greater than the said threshold;
- the formation of a signal representing a position of an event as a function of the threshold-exceeded signals.

Such a method according to the invention is advantageously applicable to an attenuation equalisation by transmission imaging method or to a coincidence PET type imaging method. The principles of these methods have been described in the introduction to the present application.

BRIEF DESCRIPTION OF THE DRAWINGS

In any case, the characteristics and advantages of the invention will emerge more clearly in the light of the description which follows. This description concerns the example embodiments, given by way of explanation and being non-limitative, referring to accompanying drawings in which:

FIG. 2, already described, shows schematically a device for collecting and coding signals coming from photomultipliers of the detection head of FIG. 1;

FIG. 3 depicts a circuit associated with a photodetector, for processing data from this photodetector;

FIG. 5 depicts an embodiment of a summing device;

DETAILED DESCRIPTION OF THE PREFERRED EMBODIMENTS

FIG. 3 is a partial view of a device for processing the signal according to the invention. It depicts only a single channel of such a device, that is to say the part of the device associated with a single photodetector 60. The photodetector 60 is, for example, a photomultiplier connected to a current-to-voltage converter 62. In response to an event detected by the photomultiplier, there is obtained, on the output 64 of the current-to-voltage converter 62, a signal, for example, of the type illustrated in FIG. 4A.

Figure 4A:
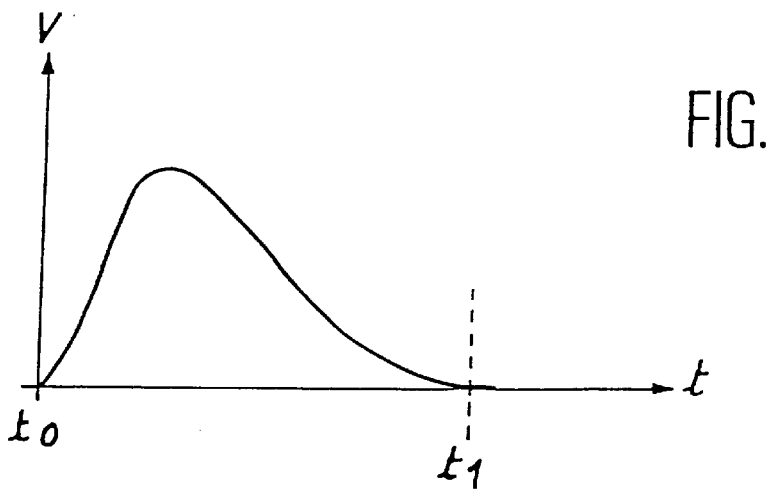
FIGS. 4A and 4B depict an analog signal supplied by a photodetector (FIG. 4A), and the digitized analog signal and a corresponding information capture timing diagram (FIG. 4B)

The graph of FIG. 4A shows, as ordinates, the amplitude of the signal corresponding to the pulse and, as abscissae, the time. The amplitude of the signal and the time are shown on an arbitrary scale. In FIG. 4, $t_0$ indicates the starting instant of the pulse supplied by the photodetector, and $t_1$ indicates the instant when the pulse becomes almost zero again, after having passed through a maximum. For information only, the duration corresponding to the interval $t_1 - t_0$ is of the order of one microsecond, in the case of a photomultiplier of a gamma camera coupled to a crystal of NaI (Tl).

Figure 4B:
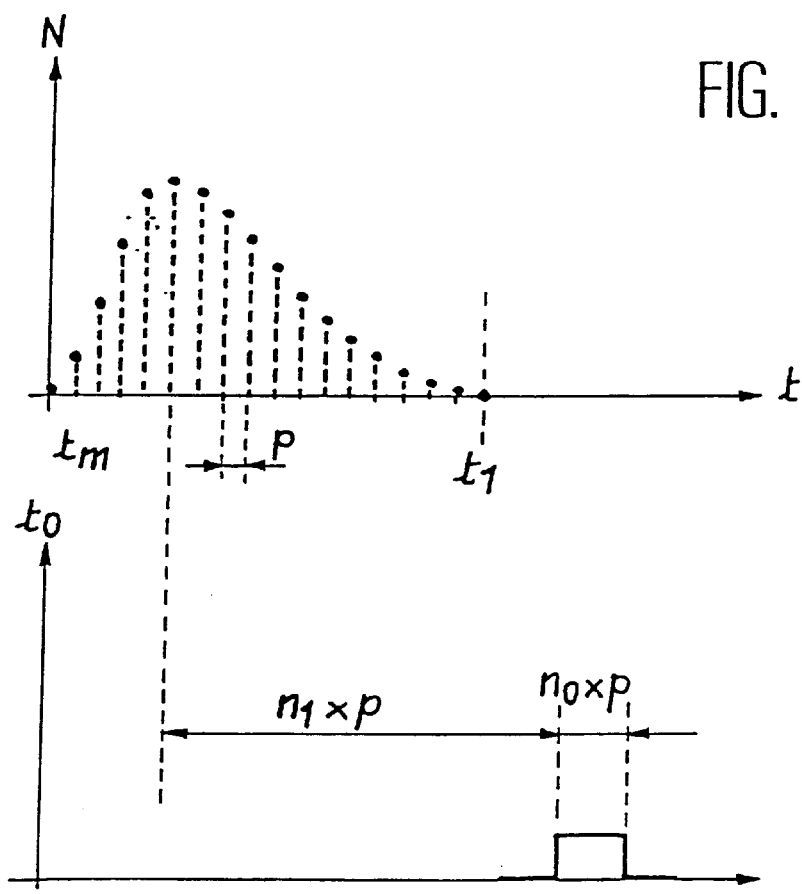

The analog signal present on the output terminal 64 is taken to an analog-to-digital converter 66. The latter samples each pulse of the signal into a certain number of samples n, as illustrated in FIG. 4B. Two consecutive samples are separated by a step, or clock interval p (the clock operating at 1/p Hz).

By way of example, the converter samples each pulse of the signal into n=10 samples. For a 1 microsecond signal, sampling is then performed every 100 nanoseconds.

The analog-to-digital converter 66 is, preferably, a high-speed converter, of "flash" type, being able to operate at a frequency of the order of 10 to 20 megahertz.

The digital signal originating from the analog-to-digital converter 66 is taken to a digital summing device 68. This summing device performs a rolling sum of the samples transmitted to it by the analog-to-digital converter 66. The rolling sum is performed on a given number of samples. This predetermined number is equal, for example, to 10.

At the same time, the result of the summation performed with the means 68 is stored in a register 71. The storage function may be composed of a number of registers in order to make it possible to store a number of events which are very close timewise.

The value of the rolling sum is taken to comparison means 70. The value of the rolling sum is compared therein with a fixed predetermined threshold value at an input 72 of the comparator 70. This comparator issues, on an output 74, a binary signal representing the result of the comparison (for example, 0 if the value of the rolling sum is less than the fixed reference value and 1 if the value of the rolling sum is greater than the reference value).

According to a particular embodiment, the summing device 68 may have, as illustrated in FIG. 5, a shift register 82 whose length determines the number of samples summed and an adder/accumulator 86. The summing input of the latter is connected to the output of the coder, and its subtracting input is connected to the output of the shift register 82, so that, at each coding step, the content of the accumulator situated in 86 (which represents the rolling sum) is corrected by the difference between the input and the output of the shift register 86. The output of the accumulator is taken to the comparator 70 which then supplies a binary threshold-exceeded signal. So as to limit the duration of this exceeding, the latter is preferably valid only during a time slot centred on the maximum of the rolling sum. This makes it possible to separate events which are close in time but geographically distinct over the field of the detector.

Figure 8:
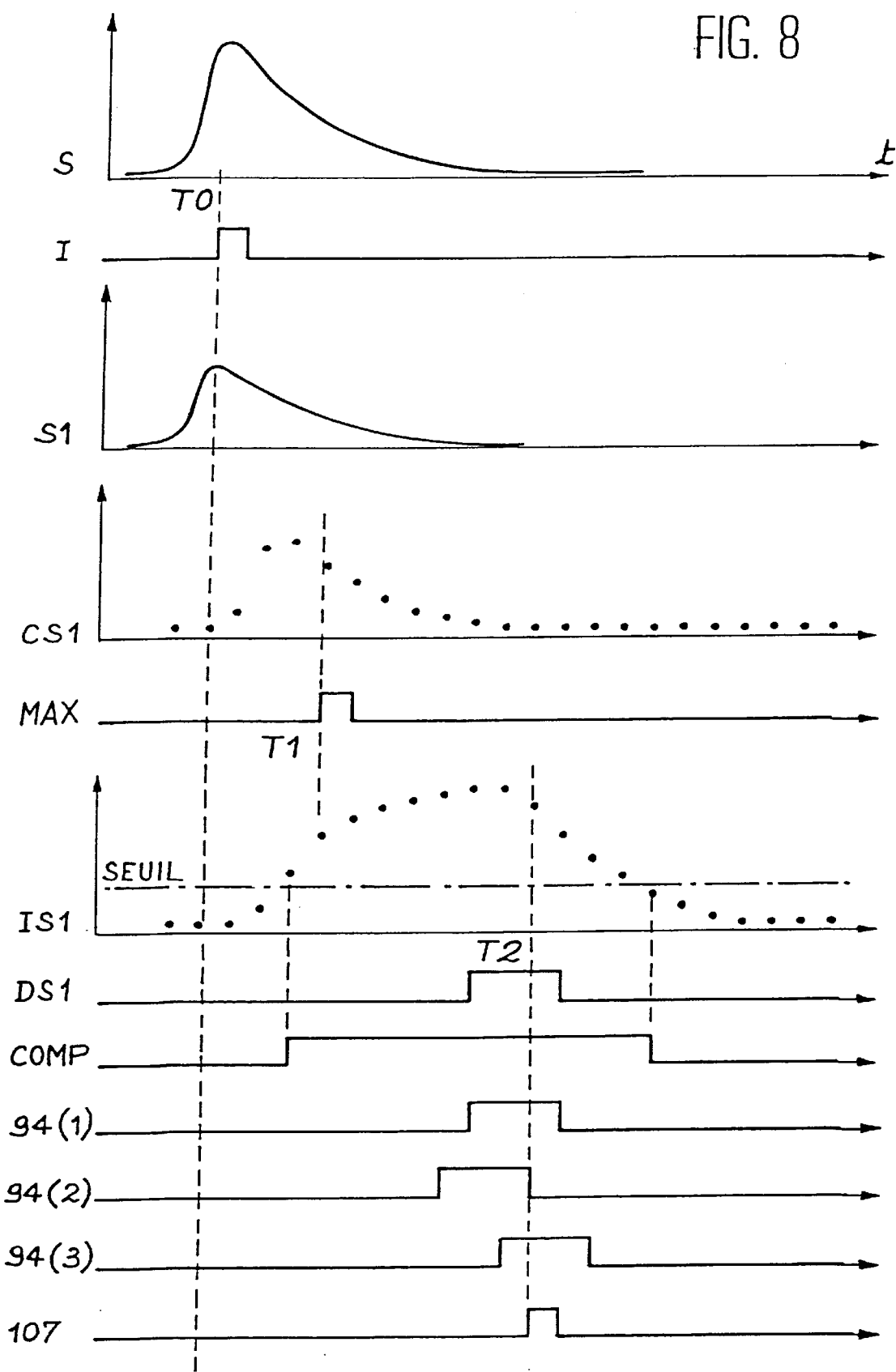
FIG. 8 is a timing diagram depicting schematically a sum of the analog signals from a photodetector assembly, the identification of the maximum of this sum, threshold-exceeded signals, the response interval of a PROM memory and a presumed position signal issued by the PROM.

This slot can be positioned by taking as a reference the instant of passage $T_1$ of the coded signal through a maximum. This detection is carried out in the entity 88 by comparing the current value of the coder output with the previous value. When the current value is less than the previous value, the comparator 88 issues a pulse referred to as MAX (FIG. 8). This pulse is sent to a shift register 90 whose delay $n_1$ is controlled in order to generate a time slot $DS_1$ centred on the maximum of the rolling sum $IS_1$. In order to take into account the inaccuracy (plus or minus one sampling step) of the determination of the position of the maximum of the coded signal, the time slot is preferably activated for no sampling steps (FIG. 4B) with $n_0>3$ (for example $n_0=3$), this choice of a minimum of three guaranteeing a minimum of simultaneity of threshold-exceeded signals between the photomultipliers activated by one and the same event.

An AND gate 92, whose inputs are the signal obtained at the output of the comparator 70, and the output signal of the shift register 90, make it possible to obtain, on its output 94, a threshold-exceeded signal (FLAG) at the desired instant with respect to the passage through the maximum of the digital sum.

In short, each photomultiplier, equipped with the device described previously, supplies two information items. A first information item is the output of the summing device 68 which represents the current integral, and a second information item, referred to as FLAG, at the output 94 of the AND 92, synchronous with the maximum of the current integral, which gives substance to the fact that the current integral has exceeded, or has not exceeded, a threshold.

Figure 6:
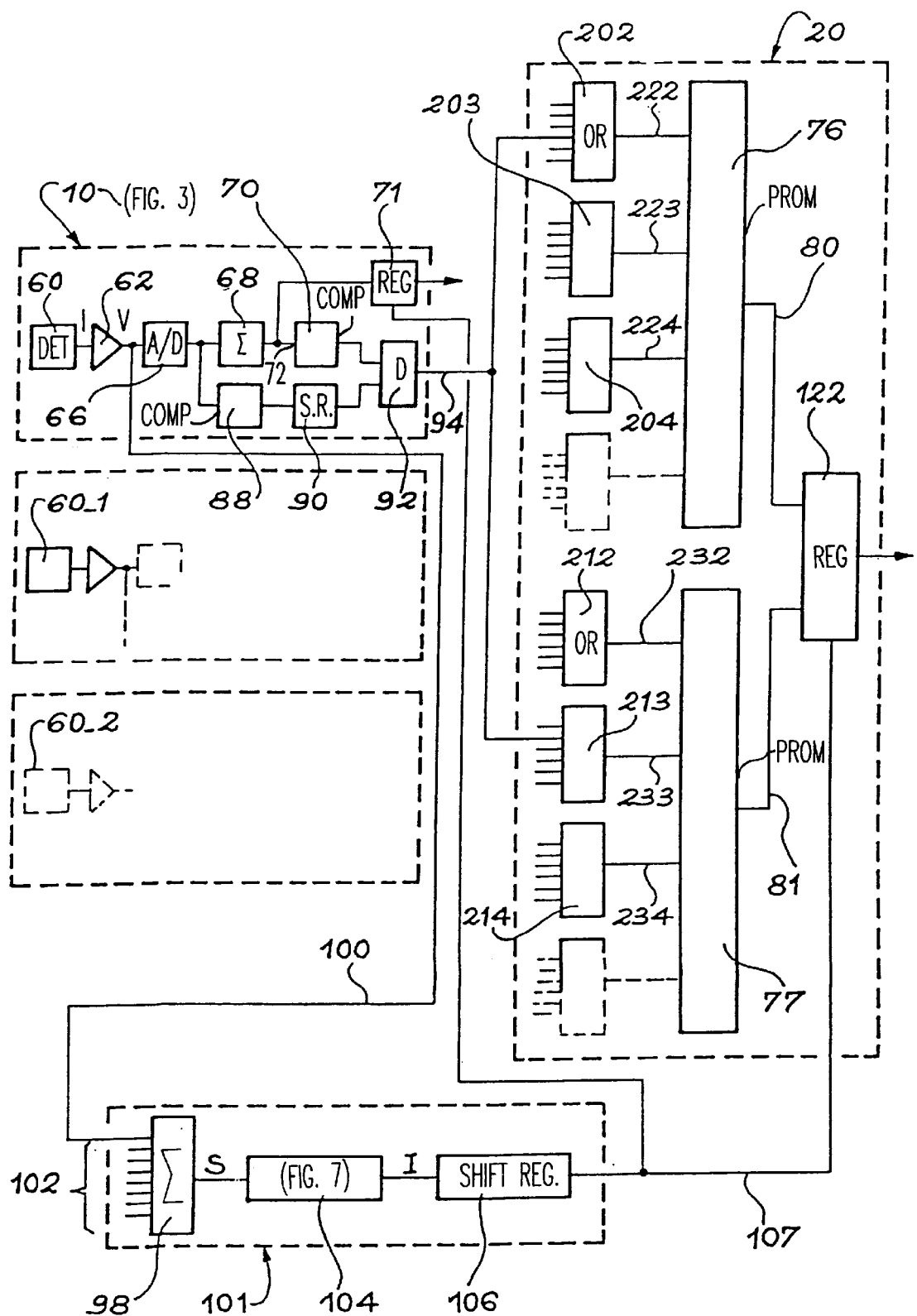
FIG. 6 depicts an embodiment of the invention.

FIG. 6 depicts a device, in accordance with the invention, for processing signals originating from a number of photodetectors 60, 60-1, 60-2. In this figure, identical references to those of FIG. 3 designate similar or corresponding elements therein.

Figure 7:
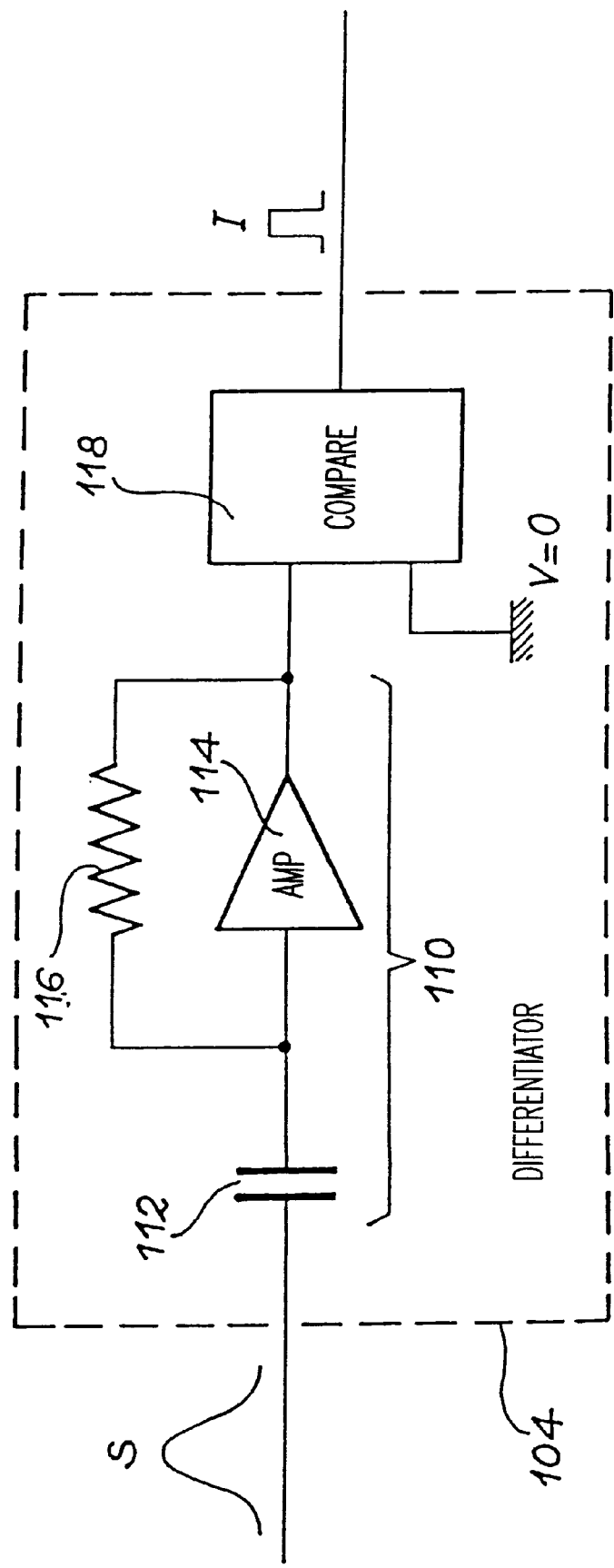
FIG. 7 depicts schematically a device for detecting the maximum of the analog signal.

In this figure, it may be seen that it is possible to take, at the output of the photodetector 60, an analog signal 100, of the type described above in connection with FIG. 4A. In FIG. 6, the reference 102 designates as a whole all the analog signals taken from the other photodetectors 60-1, 60-2, etc. All these signals go into an analog summing device 98 which delivers a signal S (FIG. 8), the sum of all the analog signals supplied by a certain number of photodetectors, for example by all the photodetectors. A device 104 makes it possible to deliver a pulse I at the time at which the signal S passes through its maximum. This device 104 has, for example, as illustrated in FIG. 7, a differentiator 110 (a capacitor 112, an amplifier 114 and a resistor 116 between the input and the output of the amplifier 114); the output of this differentiator 110 feeds a comparator 118 which makes it possible to detect the output of the differentiator going to 0. The pulse I feeds the input of a shift register 106 whose step p is controlled by the clock H. The output 107 of this register is referred to as the storage pulse and makes it possible, in particular, to activate the storage register 71 corresponding to the photodetector 60 and the register 122 corresponding to the presumed position. It also activates each storage register associated with each photodetector. The delay of the shift register 106 is controlled so that the rising edge of the storage signal 107 is synchronous with the instant at which the sums must be stored in the registers 71.

The assembly of photodetectors 60, 60-1, 60-2, etc. is distributed for example in a two-dimensional array, of the type described later in connection with FIG. 9A or 9B.

The photodetectors can therefore be located by their position along rows and columns of the two-dimensional array.

In order to locate the position of an event in relation to this two-dimensional field, or array, of photodetectors, there is advantageously associated a read-access memory with a first direction of location in the photodetector field and a read-access memory with a second direction of location in the photodetector field. If this field is located by rows and columns, there can therefore in this way be associated a read-access memory for locating a "row" coordinate and a read-access memory for locating a "column" coordinate.

More precisely, in a device according to the invention, of the type illustrated in FIG. 6, the outputs 94, which represent, when active, the photodetectors of the centre of the interaction, are used in the following manner:

an OR circuit 202 gathers together the outputs of type 94 of the photodetectors of one and the same column and generates a signal 222 which is active when at least one of its inputs is active. There are as many circuits of type 222 as there are columns, an OR circuit 212 gathers together the outputs of type 94 of the photodetectors of one and the same row and generates a signal 232 which is active when at least one of its inputs is active. There are as many circuits of type 212 as there are rows.

The signals of type 222 are the addresses of a PROM 76 which is programmed so as to supply the coordinate 80 of the presumed position in relation to the columns. Similarly, the signals of type 232 are the addresses of a second PROM 77 which is programmed so as to supply the coordinate 81 of the presumed position in relation to the rows. The presumed position, represented by the pair of values 80, 81, is stored in a register 122, at the same time as the contributions of all the photodetectors are stored in their respective registers 71. This storing is activated by the signal 107 generated by the register 106.

FIG. 8 depicts chronologically the different signals:

the signal S represents the analog sum of all the photodetectors at the time of an isolated event, the signal I represents the pulse related to the passage of S through a maximum. This pulse occurs at the instant $T_0$, the signal $S_1$ represents the output of a photodetector which is among those covering the interaction site of the event, and the signal $CS_1$ represents the signal $S_1$ after coding (at the output of the analog-to-digital coder 66), the signal MAX represents the pulse related to the passage of $CS_1$ through a maximum when $CS_1$ is greater than a threshold. This threshold is used to validate only meaningful maxima, that is to say those above the noise. The signal MAX occurs at the instant $T_1$. The duration $T_1-T_0$ is related to the coding time. The instant $T_1$ defined to within ±1 coding step. This is due to the noise of the coder on the one hand and to the noise of the signal on the other hand, the signal $IS_1$ represents the signal at the output of the summing device 68. The instant $T_2$ represents the instant at which the integral passes through a maximum, and therefore the theoretical instant at which the value of the integrals and the corresponding presumed position must be stored. The duration $T_2-T_1$ is related to the integration time, that is to say to the number of samples taken into account by the summing device (this number being itself related to the coding step and to the mean duration of the pulses), the signal $DS_1$ is generated by the shift register 90; it takes into account the inaccuracy of the determination of $T_1$. It lasts for three coding steps, and is delayed with respect to $T_1$ so as to be centred on $T_2$, the signal COMP is supplied by the comparator 70. The comparison threshold is controlled so as to validate only the photodetectors close to the site of the interaction, the signals 94(1), 94(2) and 94(3) are the outputs 94 of three other photodetectors close to the site of the interaction for which the energy is greater than the threshold. These outputs take into account all the inaccuracy of the determination of $T_1$, and therefore of $T_2$, and this is why the storage signal 107 is generated by a separate analog chain, the storage signal 107 is generated from the signal I, delayed by the circuit 106. This shift is controlled so that the integrals and the corresponding presumed position are stored at the instant which represents the mean value of the different instants $T_2$.

Figure 1:
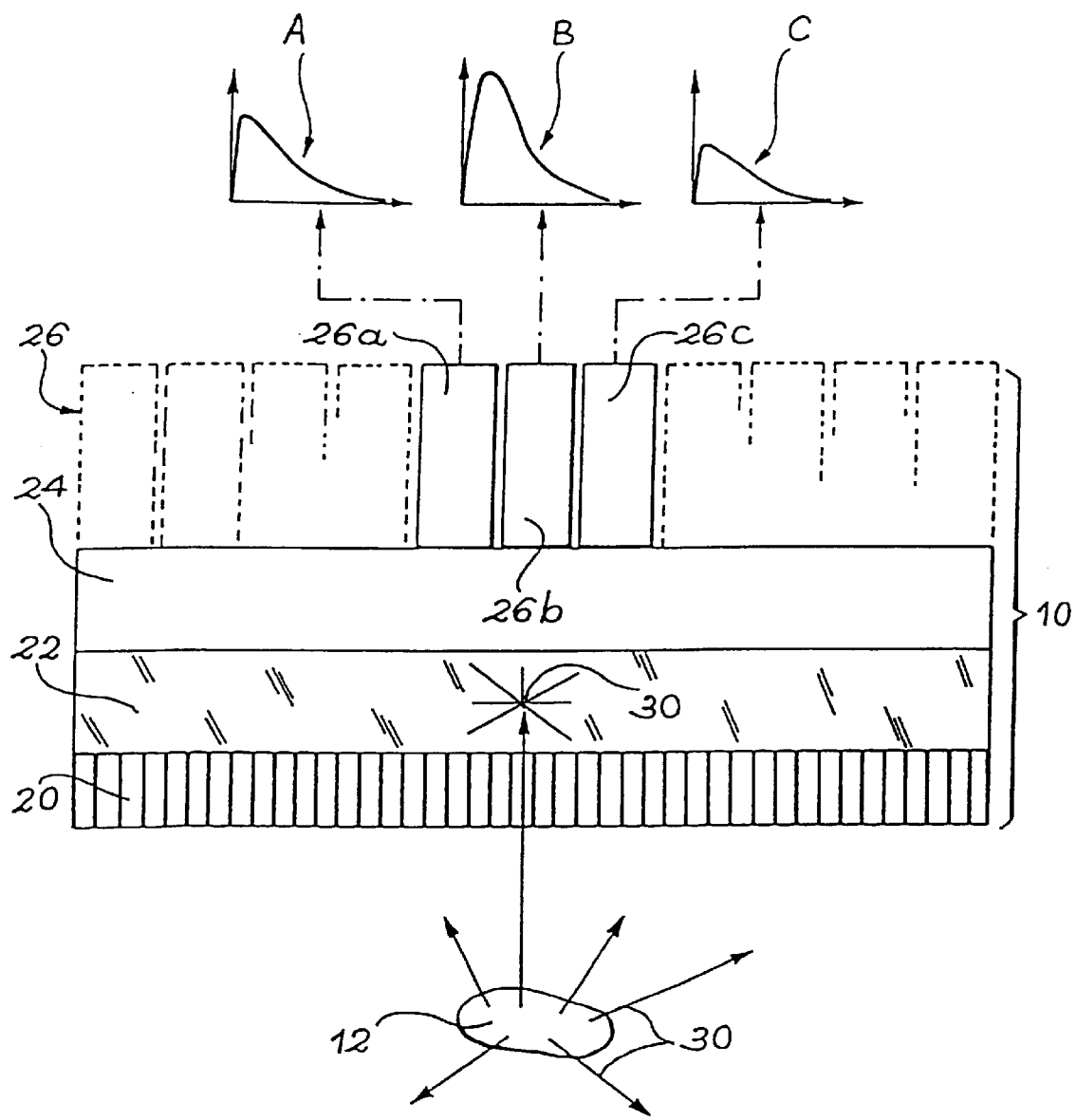
FIG. 1, already described, is a schematic section of a detection head of a known Anger type camera.
Figure 9A:
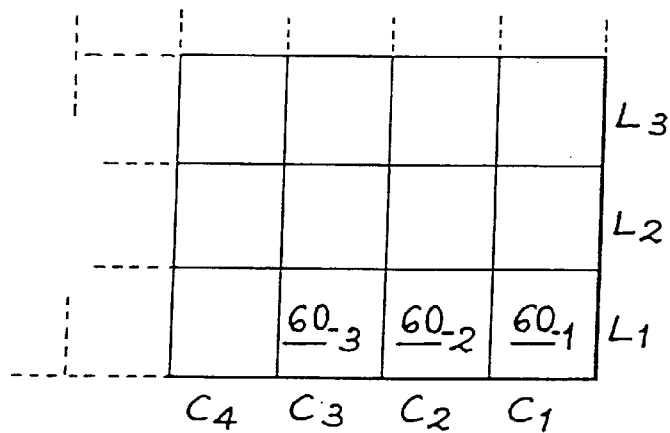
FIGS. 9A and 9B depict two examples of photodetector fields, with different symmetries.
Figure 9B:
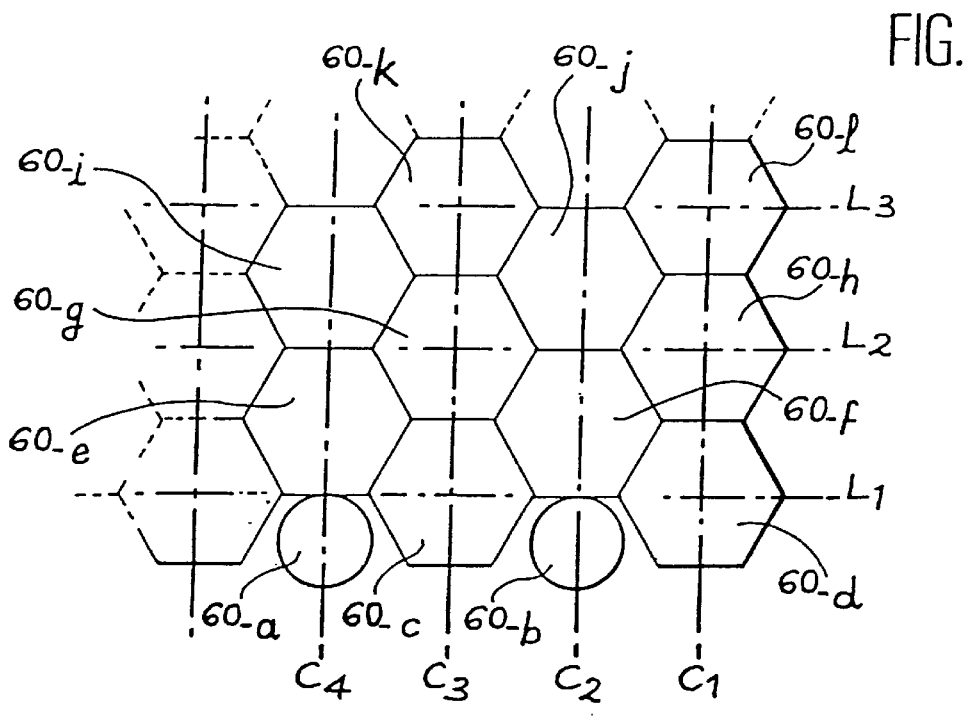

Examples of two-dimensional arrays of photodetectors are illustrated in FIGS. 9A and 9B. More precisely, these figures depict, in each case, a position of an array of photodetectors in a top view (or, in other words, if reference is made to FIG. 1, seen from the scintillator 22). The cross-section of a photodetector can have various forms, for example, square, hexagonal, or circular.

FIG. 9A corresponds to a photodetector field, in a top view, each photodetector having a square section. In this case, each photodetector can issue a threshold-exceeded signal which can locate it along one row and along one column. Thus, in FIG. 9A, the photodetector 60-1 can, in response to an event, issue a signal which, if it exceeds a certain threshold, will cause the issuing of a threshold-exceeded signal locating the row $L_1$ and the column $C_1$. Similarly, the photodetector 60-2 can be located by the row $L_1$ and the column $C_2$, threshold-exceeded signals being sent to the memories 76, 77, which correspond to the row $L_1$ and the column $C_2$.

FIG. 9B depicts, in a top view, a mixed field of hexagonal and round photodetectors. The photodetectors 60-a, 60-b have a circular cross-section, while the other photodetectors have a hexagonal cross-section. In such a case, the photodetector field clearly defines juxtaposed columns 60-i, 60-e, 60-a ($C_4$); 60-k, 60-g, 60-c ($C_3$), 60-j, 60-f, 60-b ($C_2$); 60-l, 60-h, 60-d ($C_1$). Each photodetector corresponds to one column and one only. On the other hand, the assignment of one row to one photodetector is made unambiguously solely for the case where the said row passes through the middle of the photodetector: in FIG. 9B, this is the case for the photodetectors 60-k, 60-l (row $L_3$); 60-g, 60-h (row $L_2$); 60-c, 60-d (row $L_1$). For the other photodetectors, situated between two rows, it is preferable that their threshold-exceeded signal results, to the corresponding read-access memory, in an issuing of addressing signals corresponding at the same time to the two rows between which they are situated. Thus, if the photodetector 60-f delivers a signal whose energy exceeds the fixed threshold, a threshold-exceeded signal is issued for the column $C_2$ and for the rows $L_1$ and $L_2$. Similarly, when an event causing the threshold to be exceeded for the photodetector 60-j, the result of this is a signal for addressing column $C_2$ and for addressing rows $L_2$ and $L_3$.

A method will now be described which makes it possible to define, or code, the signal representing a position of an event, as a function of the threshold-exceeded signals. In the case of a read-access memory, it is a matter of carrying out the coding of the row and/or column combinations for which a threshold-exceeded signal appears at the time of an event.

Figure 10:
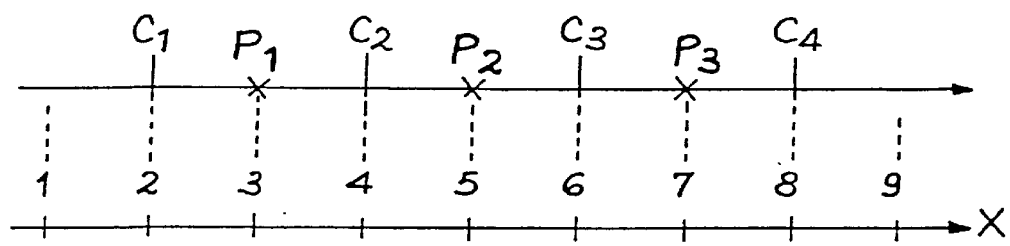
FIG. 10 depicts positions, or an array, of columns of a photodetector field and possible positions of events in relation to this array of columns.

As illustrated in FIG. 10, and still keeping the example of an assembly of four columns of photodetectors $C_1-C_4$, it is possible to locate, not only the position of the columns along an axis, but also the position of the points $P_1, P_2, P_3$ situated halfway between the columns (points to which odd figures are assigned on the scale at the bottom of FIG. 10). These intermediate points correspond to the limits between two neighbouring photodetectors of two neighbouring columns.

The photodetector or photomultiplier fields used at present, in particular in the case of a gamma camera, typically have at maximum between 50 and 100 photodetectors. Consequently, a dozen columns at maximum (and a dozen rows) is sufficient to describe these photodetector fields. It is therefore possible to use a read-access memory (PROM) of reasonable size (of the order of 4 kbytes) for coding the groups of columns, the successive columns constituting the addresses of the PROM. For larger fields, or arrays, of photodetectors, the size of the PROM will be chosen accordingly.

Furthermore, if the fact is taken into account that an event can in general activate only contiguous or related columns (for example, 1, 2, 3 or 4 depending on the energy of the event and the threshold used), only a restricted number of "valid" combinations is to be retained and coded. The expression of the position of the event on the X axis of location of the columns does not require eight bits; it is possible to use the most significant bit ($Q_7$) for coding the validity of the position obtained. Table I below gives the signals sent to three addressing inputs $A_0$, $A_1$, $A_2$ of a PROM, as a function of the combination of the threshold-exceeded signals for the columns C1, C2, C3 (0=no threshold-exceeded signal, 1=a threshold-exceeded signal). The decimal content of the PROM, resulting from these combinations, is given in the fourth column ($A_0=1$, $A_1=2$, $A_2=2^2$). The fifth column gives the validity bit: when two columns, separated by a third, issue a threshold-exceeded signal, while the third does not issue one, the combination is not valid and is not retained (validity bit=0). The programming of the PROM next makes it possible to assign, as a function of the decimal content, an event position:

when only the first column issues a threshold-exceeded signal (address $A_0$, the decimal content=1), the event is identified in position 2 on the X scale of FIG. 10;

when a threshold-exceeded signal corresponding to the single column C2 is issued, the event is localized in position 4 on the X scale of FIG. 10;

when threshold-exceeded signals corresponding to the columns $C_1$ and $C_2$ are issued, the event is positioned, not on one or other of the columns, but in the intermediate position 3 on the X scale (FIG. 10);

when a single threshold-exceeded signal is issued, corresponding to the column $C_3$, the event is localized in position 6 on the X scale;

when two threshold-exceeded signals are issued, corresponding to the columns $C_2$ and $C_3$, the event is localized in the intermediate position 5, on the X scale, between the columns.

TABLE I

| Address $A_0$ $C_1$ | Address $A_1$ $C_2$ | Address $A_2$ $C_3$ | Decimal content | Validity bit | Position of event (X) |
|---|---|---|---|---|---|
| 0 | 0 | 0 | 0 | 0 | 0 |
| 1 | 0 | 0 | 1 | 1 | 2 |
| 0 | 1 | 0 | 2 | 1 | 4 |
| 1 | 1 | 0 | 3 | 1 | 3 |
| 0 | 0 | 1 | 4 | 1 | 6 |
| 1 | 0 | 1 | 5 | 0 | 0 |
| 0 | 1 | 1 | 6 | 1 | 5 |
| 1 | 1 | 1 | 7 | 1 | 4 |

This coding can be generalized to four columns and over. Once the coding of the PROM has been carried out, a defined combination of columns for which threshold-exceeded signals are issued corresponds to a unique position of the event in relation to all the columns. This position is coded on the output bits of the PROM, except for the most significant bit which makes it possible to code the validity of the combination.

The same reasonings and the same type of coding can be carried out for determining the position of the event in "Y", along the rows. The threshold-exceeded signals ordered along the rows are coded with the help of a second (PROM 77 of FIG. 6, for example), which can be identical to the previous one. For the case of a field of detectors with hexagonal and/or circular section (the case of FIG. 9B), the coding of the positions of photodetectors situated between two consecutive rows does not pose any more problems: thus, the identification of an event along the column $C_2$ and along the rows $L_1$ and $L_2$ corresponds to an event localized above the photodetector 60-$f$.

The position of an event can consequently be represented by a pair (X, Y) which locates this event in the two-dimensional assembly or field of photodetectors or photomultipliers. There are retained, as the only valid positions, the only pairs (X, Y) of which both elements satisfy the validity criteria.

A device and a method according to the invention make it possible to localize an event, not only above one or other of the photodetectors of a field of photodetectors, but also at the limit of two photodetectors, perhaps even of three photodetectors.

In FIG. 6, the signal 126 issued contains this localization information. This signal can be transmitted to a microcomputer specifically programmed to select a specific environment of the group of photodetectors concerned by the interaction (that is to say of the group of photodetectors having issued a threshold-exceeded signal), which next makes it possible to calculate the characteristics of the event from the environment adopted.

Figure 11A:
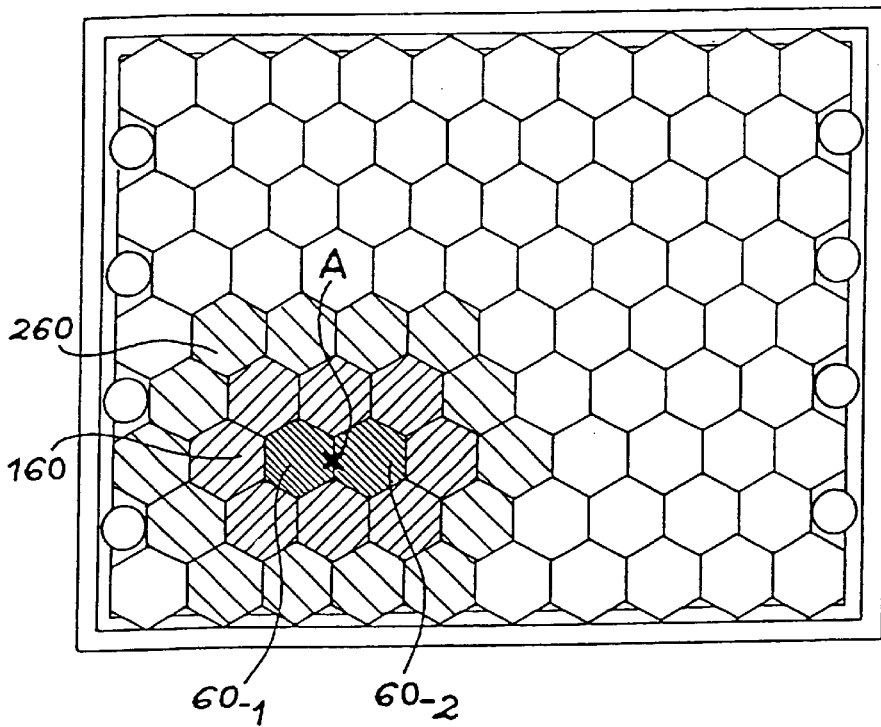
FIGS. 11A and 11B depict two examples of useful areas according to the presumed part.
Figure 11B:
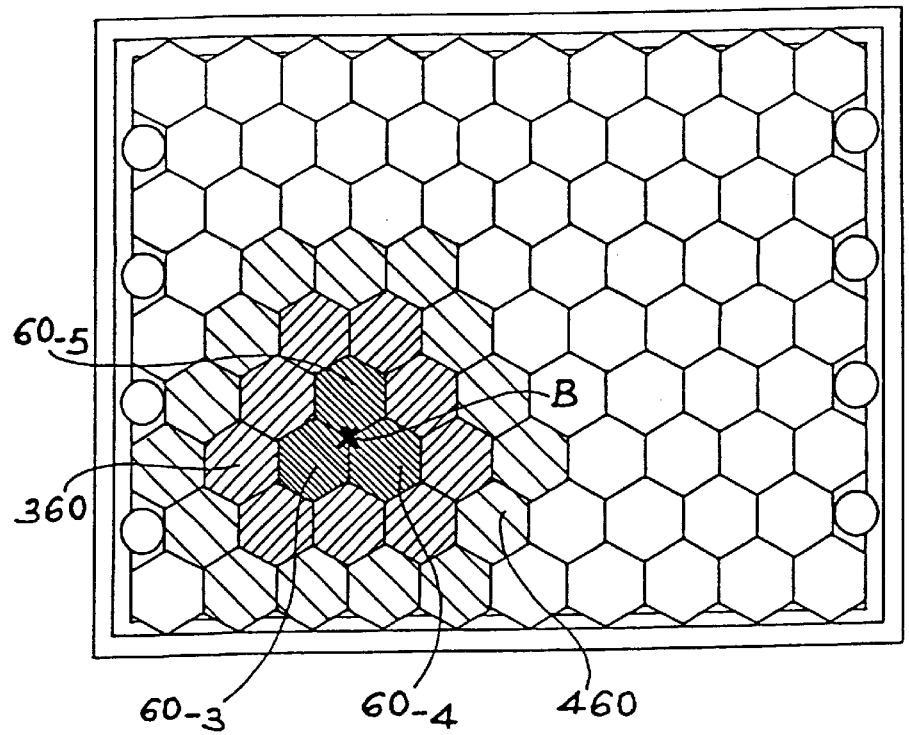

Thus, FIGS. 11A and 11B each depict a field of photodetectors with hexagonal section, supplemented on the edges by photodetectors with circular section.

In FIG. 11A, two photodetectors 60-1, 60-2, have issued threshold-exceeded signals. This results in identification of the position of the event at the limit (point A) between the two photodetectors 60-1 and 60-2. The computer to which this information is transmitted can then select, for example from a memory in which the data of intensities emitted by the photodetectors are stored, the first ring 160 of photodetectors and the second ring 260 of photodetectors, which surround the photodetectors 60-1 and 60-2 directly concerned by the interaction. The total energy of the event can, for example, be calculated, by summing all the signals delivered by the photodetectors directly concerned by the interaction (60-1, 60-2 in FIG. 11A) and all the signals issued by the photodetectors of the first ring and the second ring (160 and 260).

FIG. 11B depicts the case of an event which has induced a threshold-exceeded signal for three photodetectors 60-3, 60-4, 60-5 disposed as illustrated in FIG. 11B. The event is therefore localized to the point B, the intersection between the three photodetectors. The computer must therefore take into account the information concerning the photodetectors of the first ring 360 and the photodetectors of the second ring 460 for calculating characteristics, for example, the energy of the event.

The device according to the invention has been described using a threshold-exceeded criterion for the energy of the digitized signal. It is also possible to adopt other criteria, for example, a threshold-exceeded criterion for the maximum of the digitized signal. In this case, the comparator 70 of FIG. 6 compares the digitized signal originating from the digitizer 66 with a predetermined threshold value.

The method of coding by PROM which has been described makes it possible to obtain, with very great speed, a positioning signal for the event. An algorithmic method would be slower.

The PROM memories can be replaced by any type of device or memory in which a positioning coding can be entered or stored. Thus, the description produced with a PROM can be generalized to any programmable read-access coding medium or means.

It can be worthwhile to carry out the coding with the help of memories which can be reprogrammed. The device is then in fact reusable for other photodetector configurations.

What is claimed is:

1. A device for processing signals from an assembly of N photodetectors having:

a) means, associated with each photodetector, for producing a signal representing the value of one of a group consisting of the maximum, or the energy, of a pulse delivered by the photodetector and digitized;

b) means for producing a signal of exceeding of a threshold for each photodetector when the amplitude of the signal representing the value of one of the group consisting of the maximum, or the energy, of the pulse is greater than the said threshold; and c) means, common to the photodetectors, for delivering a signal representing a position of an event as a function of the threshold-exceeded signals, these means constituting means for delivering:

1) a first signal, representing a first position, if a single threshold-exceeded signal is delivered, coming from any first photodetector among the N photodetectors;

2) a second signal, representing a second position, if a single threshold-exceeded signal is delivered, coming from a second photodetector, a neighbor of the photodetector; and 3) a third signal, representing a third position, different from the first and second positions, if two threshold-exceeded signals corresponding to the first and second neighboring photodetectors are issued.

2. A device according to claim 1, also having means, associated with each photodetector, for detecting the timewise position of the maximum of the digitized pulse and for delaying the issuing of the threshold-exceeded signal for a certain duration from the said timewise position.

3. A device according to claim 1, further having:
   means for forming a total analog signal, equal to the sum of the analog signals delivered by $N_1$ photodetectors ($N_1 \leq N$);
   means for delivering a signal representing the timewise position of the maximum of the total analog signal; and
   means for delaying the delivery of the signal representing the position of an event for a certain time interval running from the timewise position of the maximum of the total analog signal.

4. A device according to claim 1, the means for delivering a signal representing the position of an event being such that the said signal depends only on threshold-exceeded signals produced inside a time slot whose instant of origin is fixed with a shift with respect to each event.

5. A device according to claim 1, the means for delivering a signal representing a position being such that such a signal is issued only if all the threshold-exceeded signals produced correspond to neighboring photodetectors.

6. A device according to claim 1, further having, for each photodetector, means of digitizing a pulse delivered by the photodetector, the digitizing being performed with a duration p.

7. A device according to claim 6, each threshold-exceeded signal being issued for a duration greater than or equal to 3 p.

8. A device for detecting events including a device according to claim 1, having:
   a two-dimensional array of N photodetectors, defining a map;
   digitization means, associated with each photodetector;
   the device according to claim 1.

9. A device according to claim 8, the signal representing a position of an event having a first component and a second component, each component corresponding to a coordinate of the event located in the map of the two-dimensional photodetector array.

10. A device according to claim 8, the photodetectors being disposed in a square array.

11. A device according to claim 10, the photodetectors having a square cross-section.

12. A device according to claim 8, the photodetectors being disposed in a hexagonally symmetrical array.

13. A device according to claim 12, the photodetectors having a hexagonal or circular cross-section.

14. A device according to claim 1, the means for delivering a signal representing a position of an event not delivering any position signal when two threshold-exceeded signals are issued by non-neighboring photodetectors.

15. A device for processing signals from an assembly of N photodetectors, having:
   a) N digital coding units;
   b) one of a group consisting of digital summation means or maximum amplitude detection means, associated with each digital coding unit;
   c) means of comparing an output signal from the one of the group consisting of the digital summation means or the maximum amplitude detection means, with a pre-determined value; and
   d) at least one read-only memory, addressed by the outputs of the comparing means, and configured to deliver:
      1) a first signal, representing a first position, if a single threshold-exceeded signal is delivered, coming from any first photodetector among the N photodetectors;
      2) a second signal, representing a second position, if a single threshold-exceeded signal is delivered, coming from a second photodetector, a neighbor of the first photodetector; and
      3) a third signal, representing a third position, different from the first and second positions, if two threshold-exceeded signals corresponding to the first and second neighboring photodetectors are issued.

16. A device according to claim 15, further having, associated with each digital coding unit:
   means of detecting the timewise position of the maximum of a digitized pulse, these means being controlled by the corresponding digital coding unit;
   a shift register; and
   an AND gate controlled by the output of the comparing means and the output of the shift register.

17. A device according to claim 15, further having:
   analog summation means intended to receive, at the input, the outputs of the N photodetectors;
   means of detecting a maximum of an analog signal, controlled by the analog summation means;
   a shift register controlled by the maximum detecting means; and
   a register controlled by the read-only memory and by the previous shift register.

18. A device according to claim 15, having two read-only memories.

19. A device for detecting events including a device according to claim 15, having:
   a two-dimensional array of N photodetectors; and
   the device according to claim 15.

20. A camera having a device according to claim 19, the photodetectors being photomultipliers.

21. A gamma radiation imaging device, having a camera according to claim 20.

22. A method of processing signals produced by an assembly of N photodetectors, in response to an event, this method including:
   a) for each photodetector, producing a signal representing the value of the maximum, or the energy, of a pulse delivered by the photodetector and digitized;
   b) producing a signal of exceeding of a threshold, for each photodetector, when the amplitude of the signal representing the value of one of a group consisting of the maximum, or the energy, of the digitized pulse, is greater than the said threshold; and
   c) forming a signal representing a position of an event as a function of the threshold-exceeded signals, the forming step constituting:
      1) forming a first signal, representing a first position, if a single threshold-exceeded signal is delivered, coming from any first photodetector among the N photodetectors;
      2) forming a second signal, representing a second position, if a single threshold-exceeded signal is delivered, coming from a second photodetector, a neighbor of the first photodetector; and
      3) forming a third signal, representing a third position, different from the first and second positions, if two threshold-exceeded signals corresponding to the first and second neighboring photodetectors are issued.

23. A method according to claim 22, further including, for each photodetector, detection of the timewise position of the maximum of the digitized pulse, and delaying of the issuing of the threshold-exceeded signal for a certain duration from the said timewise position.

24. A method according to claim 22, further including:
forming a total analog signal, equal to the sum of the analog signals delivered by $N_1$ photodetectors ($N_1 \leq N$);
delivering a signal representing the timewise position of the maximum of the total analog signal; and
delaying the delivery of the signal representing the position of an event for a time interval running from the timewise position of the maximum of the total analog signal.

25. A method according to claim 22, the forming of a signal representing the position of an event being such that the said signal depends only on threshold-exceeded signals produced inside a time slot whose instant of origin is fixed with a shift with respect to each event.

26. A method according to claim 22, the forming of a signal representing a position being such that a signal is issued only if all the threshold-exceeded signals produced correspond to neighboring or related photodetectors.

27. A method according to claim 22, further including, for each photodetector, a step of digitizing a pulse delivered by the photodetector, the digitizing being performed with a certain duration p.

28. A method according to claim 27, each threshold-exceeded signal being issued for a duration greater than or equal to 3 p.

29. A method for detecting events in relation to a two-dimensional array of photodetectors, defining a map, digitization means being associated with each photodetector, this method including a signal processing method to according to claim 22.

30. A method according to claim 29, the signal representing a position of an event having a first component and a second component, each component corresponding to a coordinate of the event located in the map of the two-dimensional photodetector array.

31. A method according to claim 22, the forming of a signal representing a position of an event being such that no position signal is formed or delivered when two threshold-exceeded signals are issued by non-neighboring photodetectors.

32. A method according to claim 22, the photodetectors being photomultipliers of a gamma camera.

33. An attenuation equalization by transmission imaging method, implementing the method according to claim 32.

34. A coincidence PET imaging method, implementing the method according to claim 32.

* * * * *